(12) United States Patent
Brenzel et al.

(10) Patent No.: US 9,143,966 B2
(45) Date of Patent: Sep. 22, 2015

(54) REMOTE ACCESS TO A WIRELESS DEVICE

(71) Applicant: Nokia Corporation, Espoo (FI)

(72) Inventors: Aaron Brenzel, Oak Park, IL (US); Paul Sernatinger, Chicago, IL (US); James Werwath, Mount Prospect, IL (US); Hemanth Kumar Remala, Chicago, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/159,232

(22) Filed: Jan. 20, 2014

(65) Prior Publication Data

US 2015/0208258 A1    Jul. 23, 2015

(51) Int. Cl.
| | | |
|---|---|---|
| *H04M 3/00* | (2006.01) | |
| *H04W 24/08* | (2009.01) | |
| *H04W 60/00* | (2009.01) | |
| *H04W 76/02* | (2009.01) | |
| *H04M 1/725* | (2006.01) | |
| *H04W 24/06* | (2009.01) | |

(52) U.S. Cl.
CPC .......... *H04W 24/08* (2013.01); *H04M 1/72563* (2013.01); *H04M 1/72583* (2013.01); *H04W 24/06* (2013.01); *H04W 60/00* (2013.01); *H04W 76/02* (2013.01)

(58) Field of Classification Search
CPC ....... H04L 1/0028; H04L 43/50; H04L 43/00; H04L 12/2602; H04L 41/14; H04L 41/145; H04L 41/5074; H04L 67/025; H04W 24/04; H04W 88/02; H04B 17/00; G06Q 30/0242; G06Q 30/0246; G06Q 30/0255

USPC .......................................................... 455/418
See application file for complete search history.

(56) References Cited

U.S. PATENT DOCUMENTS

| | | | | |
|---|---|---|---|---|
| 8,001,529 | B2 * | 8/2011 | Babut et al. .................... | 717/124 |
| 8,818,354 | B1 * | 8/2014 | Bennett .......................... | 455/423 |
| 2005/0130645 | A1 * | 6/2005 | Albert Dobson et al. ..... | 455/423 |
| 2007/0032991 | A1 * | 2/2007 | Bingham et al. .............. | 702/189 |
| 2008/0039070 | A1 * | 2/2008 | Ptashek ......................... | 455/423 |
| 2009/0209250 | A1 * | 8/2009 | Huq ............................... | 455/425 |
| 2010/0080143 | A1 * | 4/2010 | Topaltzas et al. ............. | 370/253 |
| 2010/0095159 | A1 * | 4/2010 | Jeong et al. .................... | 714/38 |
| 2010/0197299 | A1 * | 8/2010 | Huber et al. ................... | 455/425 |
| 2013/0110979 | A1 | 5/2013 | Zhu et al. | |
| 2013/0179858 | A1 | 7/2013 | Mecke et al. | |
| 2013/0318498 | A1 | 11/2013 | Mittal et al. | |
| 2014/0095933 | A1 * | 4/2014 | Griesinger et al. ............. | 714/32 |
| 2014/0237451 | A1 * | 8/2014 | Koneru et al. ................ | 717/124 |

FOREIGN PATENT DOCUMENTS

| | | | |
|---|---|---|---|
| WO | WO2013063162 A3 | 5/2013 | |
| WO | WO2013119205 A1 | 8/2013 | |

\* cited by examiner

*Primary Examiner* — Kwasi Karikari
(74) *Attorney, Agent, or Firm* — Lempia Summerfield Katz LLC (57) ABSTRACT

In one embodiment, a mobile device is tested remotely under normal operating conditions. One or more mobile devices register with a proxy server through a registration message that includes an identification value from a mobile application running on the mobile device. A persistent connection is established with the mobile device. A testing command is sent to the mobile application. The testing command directly manipulates a user interface of the mobile application. The mobile application returns a state message that describes the state of the mobile application after the testing command has been executed.

18 Claims, 5 Drawing Sheets

REMOTE ACCESS TO A WIRELESS DEVICE

FIELD

The following disclosure relates to remote access to a wireless device, or more particularly, remote access to a wireless device for the purpose of testing a mobile application.

BACKGROUND

Software applications designed for mobile platforms, which may be referred to as mobile applications or apps, interact with remote servers to provide services to the user. Thorough testing of mobile applications includes testing the data exchange with remote servers, testing interaction with the user, and testing communication with the mobile network. Testing or other issue diagnosis may be performed by the manufacturer in a simulated environment. For example, testing on mobile devices may be performed through a cable that connects the mobile device to a computer.

However, perfect simulations of the mobile network and interaction with the user may not be possible. Some problems may only arise when the device is running "in the wild" and connected to the mobile networks. Limitations in device functionality as well as obstacles in carrier operated networks make such testing difficult, if not impossible.

SUMMARY

In one embodiment, a mobile device is tested remotely under normal operating conditions. One or more mobile devices register with a proxy server through a registration message that includes an identification value from a mobile application running on the mobile device. A persistent connection is established with the mobile device. A testing command is sent to the mobile application. The testing command directly manipulates a user interface of the mobile application. The mobile application returns a state message that describes the state of the mobile application after the testing command has been executed.

BRIEF DESCRIPTION OF THE DRAWINGS

Exemplary embodiments of the present invention are described herein with reference to the following drawings.

DETAILED DESCRIPTION

Traditional techniques for the testing of mobile applications by the developer may not precisely match the typical operating conditions of the mobile application. The following embodiments provide techniques to access and manipulate a running application during normal operating conditions at the level of one or more application programming interfaces (APIs) of the mobile application. The mobile application may be remotely controlled by accessing public classes, private classes, methods, and functions defined by the mobile application. A two-way communication channel is established between the mobile application and a remote client to control and monitor the mobile application.

Figure 1:
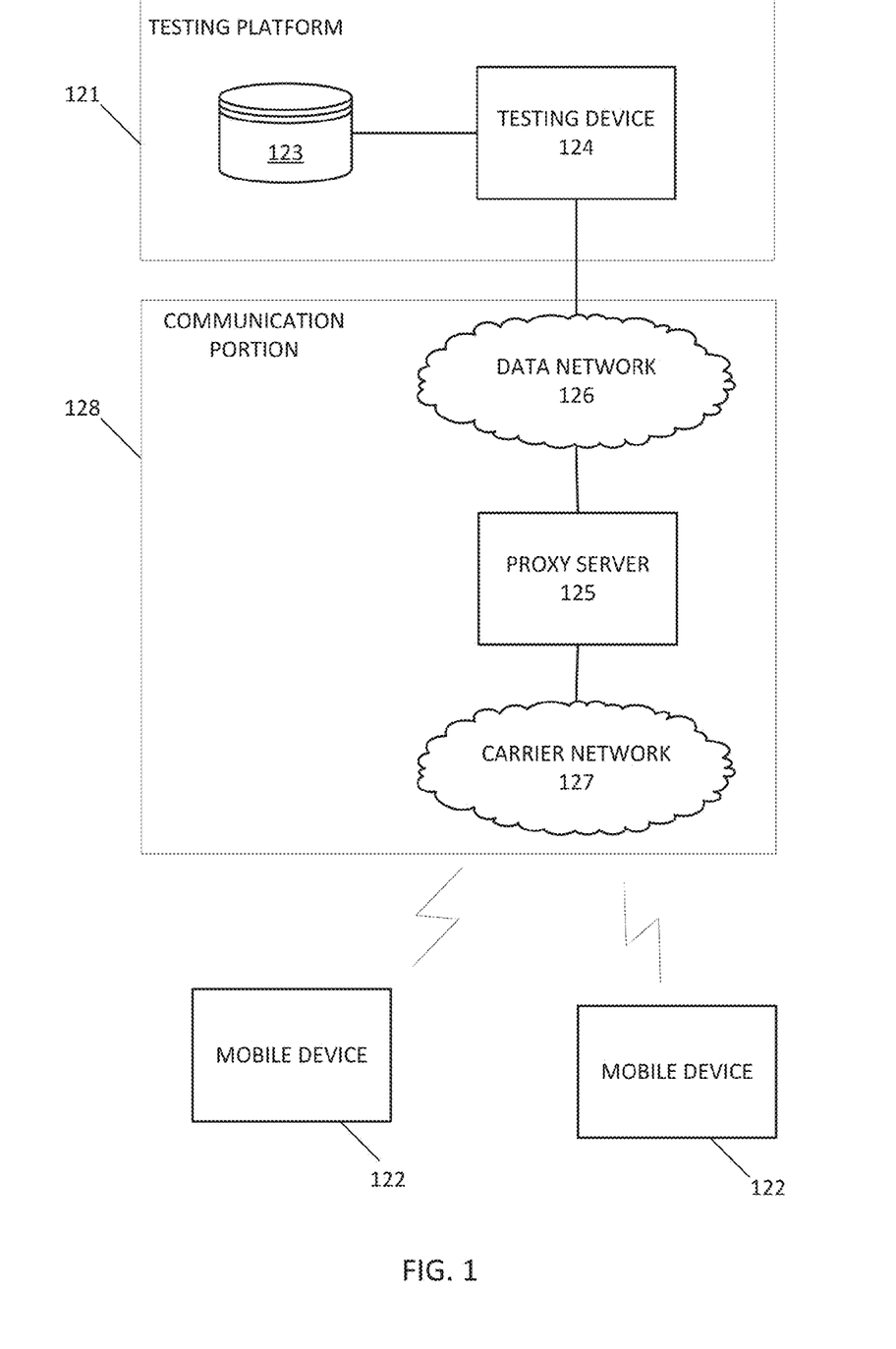
FIG. 1 illustrates an example system for remote access testing of a mobile device.

FIG. 1 illustrates an example system for remote access testing of a mobile device. The system includes a testing platform 121, a communication portion 128, and one or more mobile device 122 coupled with the communication portion 128. The testing platform 121 may include a testing device 124 and a database 123. The communication portion 128 may include a data network 126, a proxy server 125, and a carrier network 127. Additional, different, or fewer components may be included. The phrase "coupled with" is defined to mean directly connected to or indirectly connected through one or more intermediate components. Such intermediate components may include hardware and/or software-based components.

The mobile device 122 may be any device capable of executing a mobile application. The mobile device 122 may be a smart phone, a mobile phone, a personal digital assistant ("PDA"), a tablet computer, a notebook computer, a personal navigation device ("PND"), a portable navigation device, and/or any other known or later developed portable or mobile computing device.

The mobile device 122 is configured to generate a registration message that includes an identification value. The identification value may identify the mobile device 122 and/or a mobile application running on the mobile device 122. The identification value may include an address (e.g., internet protocol (IP) address or machine access control (MAC) address) of the mobile device 122. The identification value may include a serial number, version number, or another alphanumeric code that identifies the name and/or version of the mobile application. The identification value may be a globally unique ID number (GUID) that allows remote clients to route messages through the proxy server 125 to open mobile device connections.

The testing device 124 may be a computing device comprising at least a processor, a memory, and a communication interface. The testing device 124 may be a personal computer or another device. The testing device 124 receives the registration message including the identification value from the mobile device 122. The database 123 may include a lookup table that associates identification values with various mobile applications or mobile devices 122. In one example, the lookup table is built based on received registration messages. In another example, the testing device 124 accesses the database 123 according to the identification value from a received registration message. The testing device 124 may receive the registration message directly from the mobile device 122. Alternatively, the registration message (and subsequent communications) may be received through a persistent connection established by the proxy server 125.

The proxy server 125 is any device including at least one processor configured to communicate with both the data network 126 (e.g., the Internet) and the carrier network 127 (e.g., a cellular network or a device in communication with the cellular network). The device in communication with the cellular network may be a carrier gateway. Alternatively, the proxy server 125 may also function as a carrier gateway. The proxy server 125 may include a cellular communication interface and an Internet communication interface. The proxy server 125 may connect wireless users of the carrier network 127 to the Internet.

The proxy server 125 may establish a persistent connection with the mobile device 122. The persistent connection may be a connection established using one cellular access point (e.g., tower, antenna, repeater, or another device) that is maintained, if needed, through transition to at least one second cellular access point. The proxy server 125 may receive the registration message from the mobile device 122 through the persistent connection and relay the registration message to the testing device 124.

The persistent connection may be established using hypertext transfer protocol (HTTP) as an interface but maintaining an open connection through the proxy server 125 after the mobile device 122 handshakes with the proxy server 125. The identification value (e.g., GUID) associated with each mobile device 122 or mobile application allows the testing device 124 or other remote clients to route messages through the proxy server 125 to open mobile device connections. The proxy device 125 may include a table that associates connection information of the mobile devices with the identification values. The connection information may include one or more of telephone numbers, addresses, or port numbers.

The persistent connection may also be maintained by the mobile device 122. The mobile device 122 may include a library or other logic configured to monitor the status of the connection and reestablish contact with the proxy server 125 in case of connection drops or when the mobile device 122 moves through carrier gateway zones. Accordingly, two-way communication between the proxy server 125 and the mobile device 122 is continuous, possibly with a time delay, regardless of carrier configuration or user movement.

The persistent connection may be established using a HTTP request in order to avoid any filters set up by a firewall, a deep packet inspection, or another security device. In order to maintain the connection, the HTTP request may include a keep alive header (e.g., "connection: keep alive") or another indicator of a persistent HTTP connection. In one example, the proxy server may override the presence or absence of the keep alive header so that the connection is maintained regardless of the instructions in the HTTP request. The proxy server 125 may communicate with the mobile device 122 using one or more ports assigned to HTTP requests. Because the carrier network 127 allows repeated HTTP connections, the connection with the proxy server 125 can be held open.

In response to the registration message, the testing device 124 accesses the database 123 according to the identification value to identify one or more testing commands. The testing commands may be specialized according to specific mobile applications or standardized for types or classes of mobile applications. The testing command emulates an end user operating the mobile application on the mobile device 122 in the typical environment of the mobile application.

The testing command may call a function or object of the mobile application that would normally be accessed by the user interface. For example, the object may be a widget. A widget includes any source of input on the user interface. Example widgets include a field, a button, a scroll bar, or a selector that appears on the user interface. The object may specify a location (e.g., x-component and y-component) of the graphical interface that the user could click, swipe, or otherwise touch the user interface to change the state of the mobile application. Accordingly, the testing command is configured to manipulate a user interface of the mobile application.

The mobile device 122 operates under normal conditions in response to the testing command. The mobile device 122 generates and returns a state message. The state message may be a screen shot of the current user interface or display of the mobile application. The state message may be a code that describes changes to the user interface or display that occurred as a result of the testing command.

The state message is returned to the testing device 124 directly or by way of the proxy server 125 (e.g., via the data network 126 and the carrier network 127). The state message may be analyzed by the testing device 124. The testing device 124 may compare the state message to an expected status or screen shot that should be produced by the mobile application as a result of the testing command.

In order to maintain the persistent connection, the proxy server 125 may maintain a buffer of message transferred between the mobile device 122 and the testing device 124. The buffer of messages may include message that were received at the proxy server 125 when the mobile device 122 is not connected to the carrier network 127 or is transitioning between access points. When the new access point is connected to the mobile device 122, or the connection to the first access point is reestablished, the stored messages are retrieved from the buffer and forwarded through the carrier network 127 to the mobile device 122.

Figure 2:
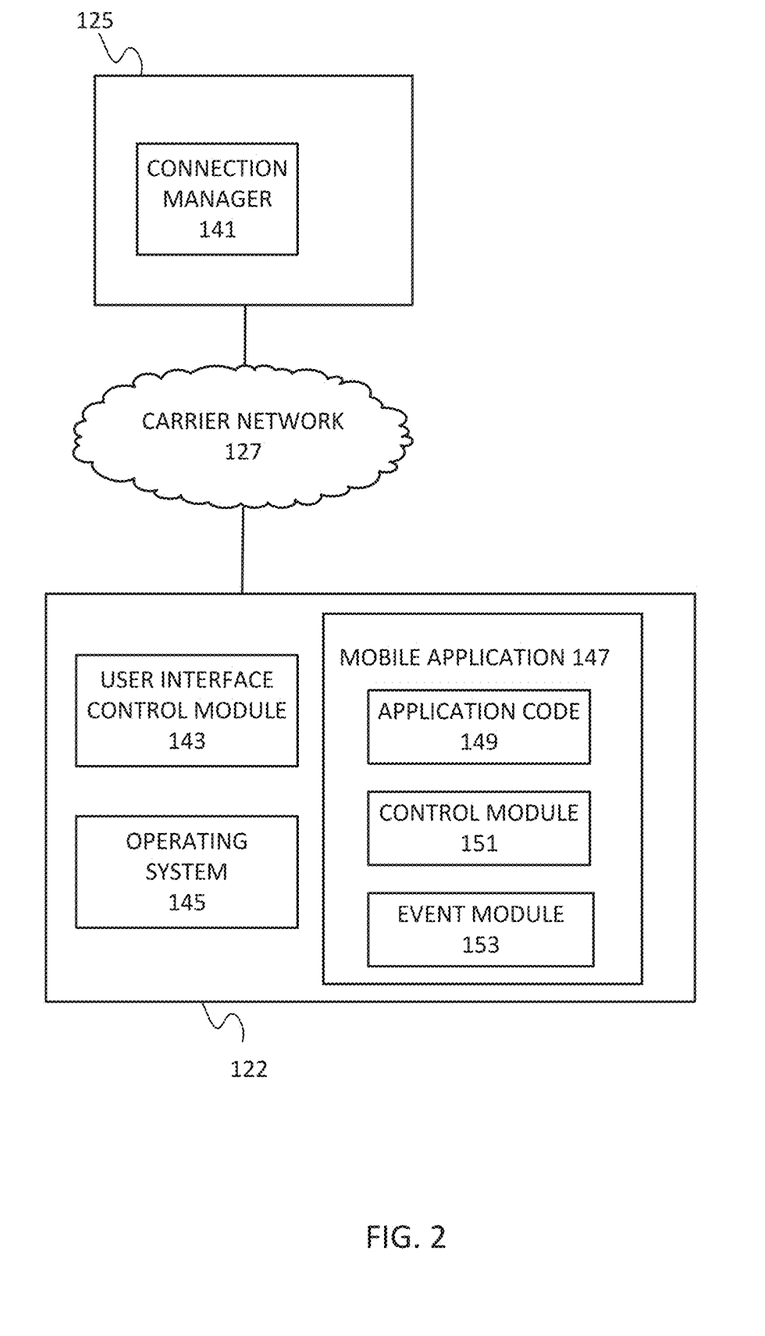
FIG. 2 illustrates a functional diagram of the proxy server and mobile device of the system of FIG. 1.

FIG. 2 illustrates a functional diagram of the proxy server 125 and mobile device 122 of the system of FIG. 1. The function diagram of the proxy server includes at least connection manager 141. The function diagram of the mobile device 122 includes at least a user interface control 143, an operating system 145, and a mobile application 147. The mobile application 147 includes an application code 149, a control module 151, and an event module 153. The functional components of the proxy server 125 and the mobile device 122 may be performed using the operating system 145 by the memory, processors, and other hardware described in other examples described herein.

The connection manager 141 is configured to compile a list of available devices that are connected to the carrier network 127. In another example, the list of available devices may be across multiple carrier networks. The proxy server 125 may send the list of available devices to the testing device 124, which selects a device from the list and directs one or more of the testing commands to the selected device by inserting an identification value into the testing command.

The testing command may be generated based on a screen shot captured by the user interface control module 143 of the mobile device 122. In one example, an initiation command from the testing device 124 instructs the user interface control module 143 to collect a screen capture, and the testing command is generated based on review of the contents of the screen capture. The review of the screen capture may be made automatically by the testing device 124 or visually by a user of the testing device or associated workstation. The testing device 124 may be configured to compare the screen capture to an expected screen capture.

The testing command may be generated based on a predetermined test script that includes a sequence of events for testing the mobile application. The test script may be stored by the testing device 124, the proxy server 125, or the event module 153 of the mobile device 122. The test script may be modified according to feedback from the mobile application or a user entry. The test script may be repeated based on a user entry or periodically.

The test script may systematically access and test every possible input, output, and/or function of the mobile application. The predetermined test script may include a series of commands that each call individual portions of the mobile application. The testing command may be generated based on a list of available objects or functions received from the mobile device 122. For example, a test script may be generated that accesses each entry in the list of available objects or functions. The list of available objects may be generated and/or stored by the event module 153.

The testing command may simulate a user entry. That is, the testing command may be equivalent to selecting a portion of the display, swiping across the screen in one or more directions, or entering data into a field. In one example, the user entry may simulate an external action on the mobile device 122, such as rotating, angling, or shaking the mobile device 122, which may be detected by an accelerometer or other motion sensors integrated with the mobile device 122.

The testing command may instruct the control module 151 to access one or more portions of the application code 149. In response, the control module 151 or the application code 149 may generate a state message. The state message includes at least one object state that describes a state of an object included in the user interface of the mobile device. For example, when the object is a data field, the state may be the data displayed in the field or a null object that indicates that the data field is empty. As another example, when the object is a checkbox, a radial button, or a scroll bar, the state may be the position of the object. The position of the object may be binary, have one component, or have two components. In another example, the state message may include the title of the current screen, a listing of bookmarks, or any test drawn on the screen, which may be transmitted as text rather than an image. The state message may also include data retrieved by the mobile application. For example, when the mobile application is a browser, the state message may include data from a website access by the browser, which may also be transmitted as text or an image.

The testing device 124 is configured to analyze the status message. The testing device 124 may be configured to compare the status to an expected status of the mobile application. The control module 151 may execute a protocol for remote testing described in the event module 153. The protocol may include a set of protocol commands. Example protocol commands include add-device, list-device, and proxy-msg. The protocol command add-device registers a device (e.g., {"cmd": "add-device", "guid": "foo", "addr": "100.20.5.123:5432"}). The protocol commands list-devices is configured to allow the testing device 124 to retrieve a list of the devices that are available for testing. The protocol command proxy-msg is configured to send the command message from the client to a device. For example, the test message {"cmd": "proxy-msg", "guid": "foo", "msg": "{\"cmd\":\"screen-shot\"}"} instructs the control module 151 to capture a screenshot of the current screen contents.

Figure 3:
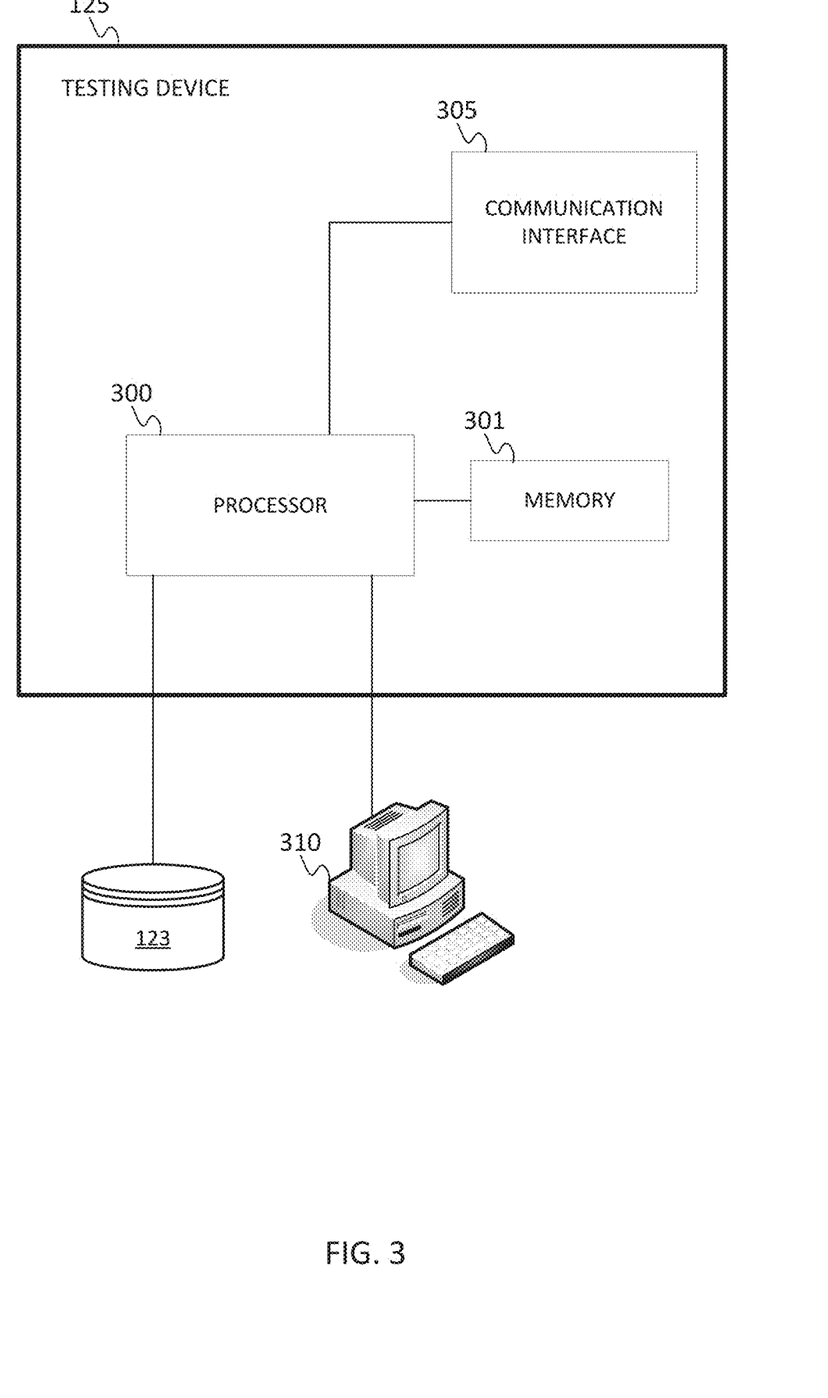
FIG. 3 illustrates an exemplary proxy server of the system of FIG. 1.

FIG. 3 illustrates an example of the proxy server 125 of the system of FIG. 1. The proxy server 125 includes a processor 300, a communication interface 305, and a memory 301. The server 125 may be coupled to a database 123 and a workstation 310. The workstation 310 may be used as an input device for the proxy server 125. In addition, the communication interface 305 is an input device for the proxy server 125. The communication interface 305 receives data indicative of user inputs made via the workstation 310 or the mobile device 122.

The memory 301 stores a lookup table for accessing test scripts or test commands with identification values. Each of the identification values may specify a specific mobile application, a type of mobile application, a specific mobile device, or a type of mobile device (e.g., by operating system). Thus, individual test commands or a series of test commands in a script may be accessed according to mobile application or mobile device. The individual test commands may identify a widget of the mobile application.

The lookup table may be modified based on registration messages received from the mobile device 122. When the proxy server 125 receives a registration message with an identification value indicative of a mobile application, the processor 300 activates the corresponding entry in the lookup table. An entry in the lookup table may be activates by a field or flag (e.g., activation flag).

The testing device 124 may probe the proxy device 125 to identify mobile devices or mobile application available for testing. The processor 301 queries the lookup table for active entries and sends a list of entries to the testing device 124. In response to instructions from the testing device 124, the processor 300 is configured to access a test command from the lookup table to send to the mobile application running on the mobile device 122. In one alternative, the testing device 124 and proxy server 125 are combined. In another example, the compilation and access of the lookup table is performed at the testing device 124.

The test script is configured to manipulate a user interface of the mobile application. The test script may perform a search on a search engine, add a photograph to a photo sharing application, post an entry to a microblog, check-in at a geographic location, or another mobile application function.

One example test script is a search on a search engine for word X. The test script may include a test command to open the search engine mobile application (e.g., load a standalone mobile application or enter an address for the search engine into a browser). Another command in the script may instruct the mobile device 122 to return a screen shot or other status message to determine that the search engine is currently displayed. Another command may enter the word X into the search field and run the search query (e.g., click go).

In one embodiment, the test script introduces a time delay for the mobile device 122 to wait before taking another screenshot or accessing object statuses. The time delay is selected to provide sufficient time for the search query to return results. In another embodiment, the mobile application sends a ready message to notify the proxy server 125 or testing device 124 that the results have been displayed.

The processor 300 is configured to analyze a status message including the screenshot or object statuses (e.g. widget state message) received from the mobile application in response to the test command. In one example, the processor 300 compares the screenshot to a template. The processor 300 may utilize an image processing technique such as edge detection or feature transform (e.g., scale-invariant feature transform (SIFT)). The image processing technique may utilize feature vectors. For example, a library of feature vectors from possible expected template may be compared to a set of feature vectors calculated from the screenshot. In another example, the processor 300 determines whether the object statuses is an expect status.

The processor 300 may calculate a matching score between the status message and the expected status message. In the case of a screenshot, the matching score may be determined from the image processing technique. In the case of alphanumeric statuses, the matching score may depend on how close the object statuses are to expected statuses. The matching score may depend on the number of or percentage of matching object statuses. The matching score may depend on a Levenshtein distance or a string metric for measuring the number of characters difference between an object status and an expected object status.

The processor 300 is configured to compare the matching score to a threshold value. If the matching score exceeds the threshold value, the processor 300 may generate a verification message that the mobile application has passed the test script. When the matching score does not exceed the threshold value, the processor 300 may generate an error message. The error message may include the matching score and/or the identification value of the mobile application.

The processor 300 may analyze multiple status messages in the course of test script. An analysis may be performed on each step of the test script before proceeding to the next step. Each analysis may involve comparing results of image processing of a screenshot or a comparison of object statuses.

The processor 300 may provide additional services. One example is encryption of the registration messages, testing commands, and status message. Another example is data aggregation of the registration messages, testing commands, and status message across multiple mobile devices or multiple carrier networks for large scale testing.

The optional workstation 310 is a general purpose computer including programming specialized for the following embodiments. For example, the workstation 128 may receive user inputs for defining the test scripts, matching score threshold, and/or identification values for the mobile application or types of mobile applications to be tested. The workstation 128 includes at least a memory, a processor, and a communication interface.

Figure 4:
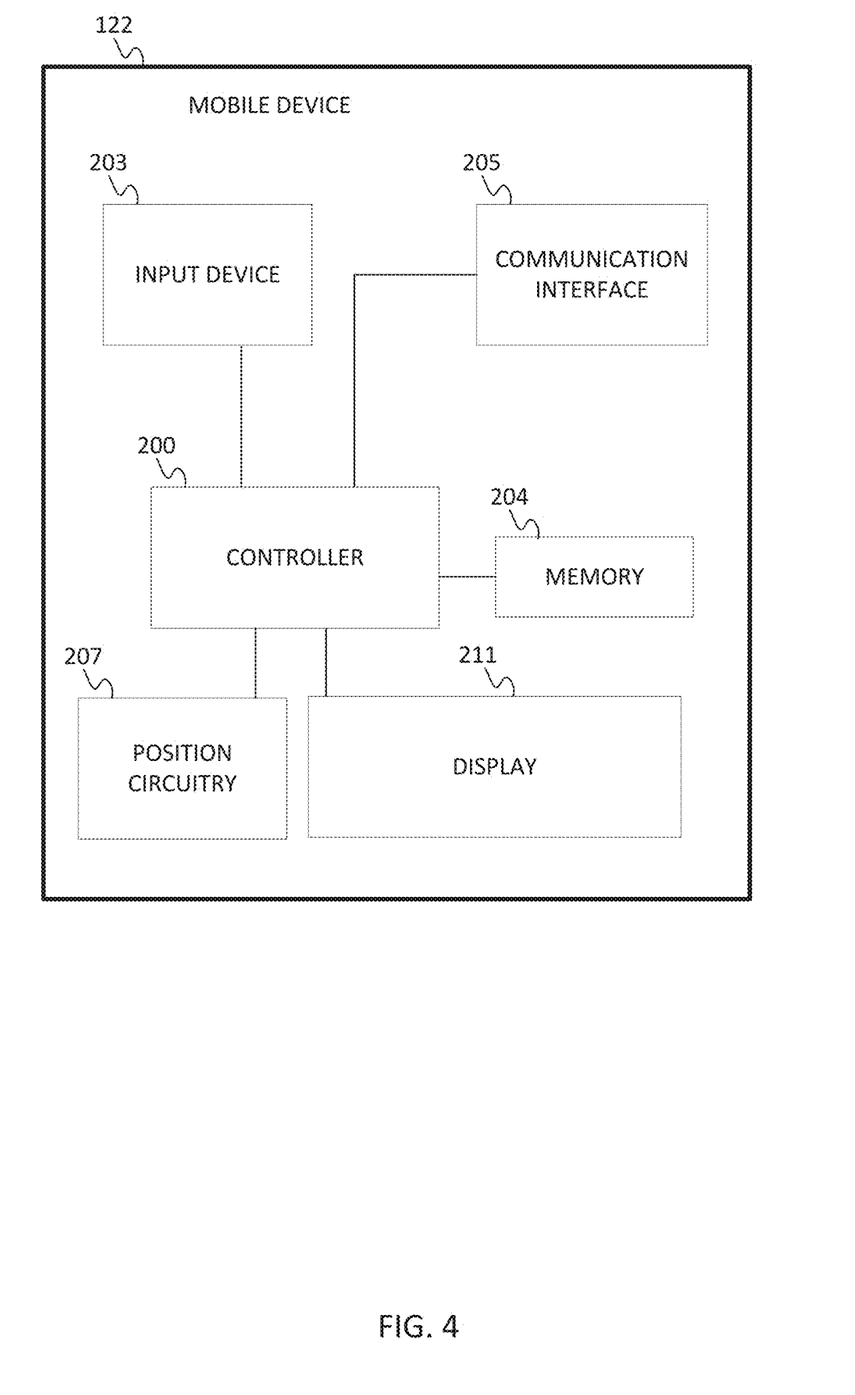
FIG. 4 illustrates an exemplary mobile device of the system of FIG. 1.

FIG. 4 illustrates an exemplary mobile device of the system of FIG. 1. The mobile device 122 includes a controller 200, a memory 201, an input device 203, a communication interface 205, position circuitry 207, and a display 211. Additional, different, or fewer components may be used.

The memory 201 may store an identification value for the mobile device 122. The identification value may identify the mobile device 122 by address, by a location determined by the position circuitry 207, or by a predetermined code. The identification value may include a list of mobile applications installed on the mobile device 122. The mobile applications may be listed by name or by type. Example types of mobile applications include internet browsers, location based services, social networking services, media services, and other examples.

The controller 200 may be configured to generate a registration message including the identification value. The communication interface 205 sends the registration message to the proxy server 125 or the testing device 124. In response, either directly or indirectly after substantial time has passed, a test message is received by the communication interface 205.

The test message may include one or more test commands to be applied to the mobile application that mimic the operation that a user would have with the mobile application. The controller 200 executes the one or more test commands and records results in memory 201. The results may include a screen shot of the display 211 after the test command has executed. The results may include a status of each of the objects and/or functions of the mobile application after the test command has executed. The communication interface 205 may return the results to the proxy server 125 or the testing device 124.

Figure 5:
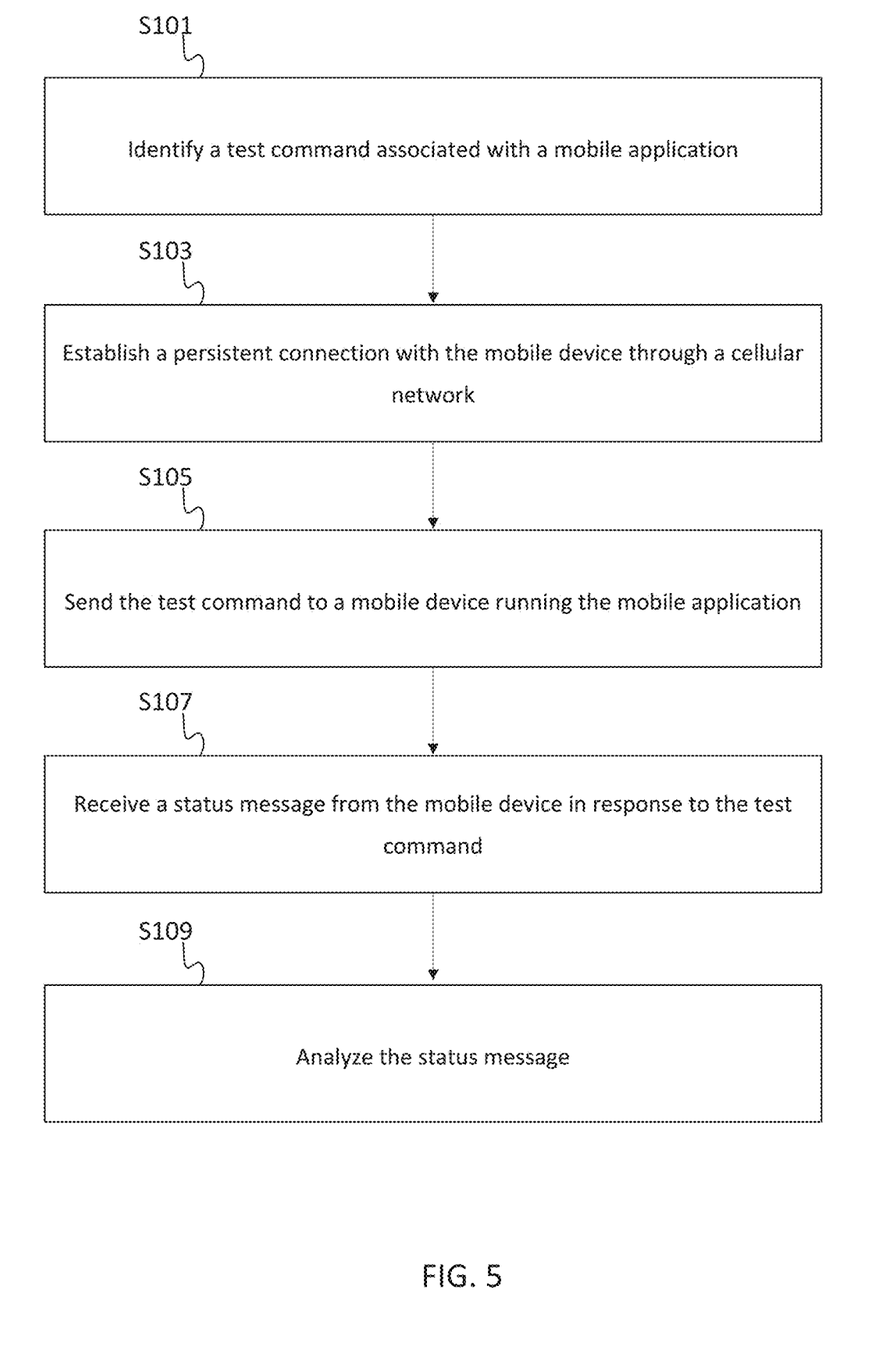
FIG. 5 illustrates an example flowchart for remote access testing of a mobile device.

FIG. 5 illustrates an example flowchart for remote access testing of a mobile device. The acts of the flowchart may be performed by the proxy server 125 or the testing device 124. The term controller may refer to either device. Additional, different, or fewer acts may be provided.

At act S101, a controller identifies a test command associated with a mobile application. The test command emulates a user entry to the mobile application. The test command may click on a button at a particular location on the display 211 of the mobile device 122. The test command may change the position of a widget on the display 211 of the mobile device 122. The test command may click on a link, enter data in a field, or make another selection. The operation of the test command may be visible in real time on the display 211.

At act S103, the controller establishes a persistent connection with the mobile device 122 through a cellular network. In one example, the controller identifies a port number associated with an HTTP connection. The controller monitors the HTTP connection. When the connection is active, messages are sent immediately to the mobile device. When the connection is not active, messages are buffered to be sent to the mobile device at a later time.

At act S105, the controller sends the test message to the mobile device 122 running the mobile application using the persistent connection. The test message may include an authorization code that allows a test script to link to a series of classes and methods in the mobile application for automated access to the mobile device memory and the manipulation of application functionality. Once the mobile application has been linked, the widgets (e.g. buttons, icons, text fields, or other objects) can be interacted with remotely. The state of the memory 201 of the mobile device 122 and objects of the mobile application may be transferred to remote subscribers (e.g., testing device 124).

At act S107, the controller receives a status message from the mobile device 122 in response to the test message. The status message may include the states of the widgets or objects linked to the test script. The status message may include the state of device memory, the state of widgets or objects, or one or more screenshots from the mobile device 122. At act S109, the controller analyzes the status message. The status message may be compared to an expected state.

The input device 203 may be one or more buttons, keypad, keyboard, mouse, stylist pen, trackball, rocker switch, touch pad, voice recognition circuit, or other device or component for inputting data to the mobile device 122. The input device 203 may be configured to receive an input for defining one or more test commands, test scripts, identifiers for the mobile application or type of mobile application to be tested, match score thresholds, or other inputs. The input device 203 and the display 211 may be combined as a touch screen, which may be capacitive or resistive. The display 211 may be a liquid crystal display (LCD) panel, light emitting diode (LED) screen, thin film transistor screen, or another type of display.

The positioning circuitry 207 is optional and may be excluded for the map-related functions. The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 201 and/or memory 301 may be a volatile memory or a non-volatile memory. The memory 201 and/or memory 301 may include one or more of a read only memory (ROM), random access memory (RAM), a flash memory, an electronic erasable program read only memory (EEPROM), or other type of memory. The memory 201 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The data network 126 may include wired networks, wireless networks, or combinations thereof. The wireless network may be an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols. The carrier network 127 is a cellular telephone network that may utilize one or more of the analog advanced mobile phone system (AMPS), the global system for mobile communication (GSM), third generation partnership project (3GPP), code division multiple access (CDMA), personal handy-phone system (PHS), and 4G or long term evolution (LTE) standards.

While the non-transitory computer-readable medium is shown to be a single medium (e.g., database 123, memory 201 or memory 301), the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/ software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
receiving a registration message from a mobile device, wherein the registration message includes an identification value from a mobile application executed by the mobile device;
establishing a persistent connection with the mobile device;
sending a testing command to the mobile application, wherein the testing command is configured to manipulate a user interface of the mobile application;
receiving a state message from the mobile application, and
compiling a lookup table including the testing command associated with the identification value for the mobile application based on the registration message received from the mobile device.

2. The method of claim 1, wherein the state message includes a screenshot of the mobile application running on the mobile device.

3. The method of claim 2, wherein the screenshot of the mobile application is compared to an expected status of the mobile application.

4. The method of claim 1, wherein the persistent connection includes a cellular network.

5. The method of claim 1, further comprising:
compiling a list of available devices, wherein the list of available devices includes the mobile device;
sending the list of available devices to a testing platform; and
receiving the testing command in response to the list of available devices.

6. The method of claim 1, wherein the state message includes at least one object state that describes a state of an object included in the user interface of the mobile device.

7. The method of claim 6, wherein the at least one object state includes a position of a widget.

8. The method of claim 1, wherein the testing command simulates a user entry.

9. An apparatus comprising:
a memory configured to store at least one test command associated with an identification value for a mobile application running on a mobile device; and
a processor configured to access a test command and send the test command to the mobile application, wherein the test command is configured to manipulate a user interface of the mobile application, wherein the processor is configured to analyze a state message received from the mobile application in response to the test command,
wherein the processor is configured to compile a lookup table including the test command associated with the identification value for the mobile application based on a registration message received from the mobile device.

10. The apparatus of claim 9, further comprising:
a communication interface configured to establish a persistent connection with the mobile application.

11. The apparatus of claim 10, wherein the persistent connection is established via an emulation of a hypertext transfer protocol (HTTP) request.

12. The apparatus of claim 10, wherein the communication interface communicates with the mobile device through a cellular network.

13. The apparatus of claim 9, wherein the state message includes a screenshot of the mobile application running on the mobile device.

14. The apparatus of claim 9, wherein the state message includes data indicative of a state of a widget of the mobile application.

15. The apparatus of claim 9, wherein the processor is configured to compare the state message to an expected state.

16. An apparatus comprising:
at least one processor; and
at least one memory including computer program code for one or more programs; the at least one memory and the computer program code configured to, with the at least one processor, cause the apparatus to at least perform:
identify a test command associated with a mobile application, wherein the test command emulates a user entry to the mobile application;
send the test command to a mobile device running the mobile application;
receive a status message from the mobile device in response to the test command, wherein the status message describes a state of the mobile device upon execution of the test command;
receive a registration message from the mobile device;
identify an identification value from the registration message; and
add an entry to a lookup table, wherein the entry associates the identification value with the testing command.

17. The apparatus of claim 16, wherein the at least one processor is configured to cause the apparatus to perform:
establish a persistent connection with the mobile device through a cellular network.

18. The apparatus of claim 16, wherein the at least one processor is configured to cause the apparatus to perform:
compare a test result screenshot included in the status message to an expected image corresponding to the screenshot.

* * * * *